US012611349B2

(12) United States Patent
Barrett et al.

(10) Patent No.: US 12,611,349 B2
(45) **Date of Patent: *Apr. 28, 2026**

(54) AEROSOL CONTAINMENT ENCLOSURE

(71) Applicant: Aerosol Containment Container, LLC, Natick, MA (US)

(72) Inventors: Sean William Barrett, Sudbury, MA (US); Richard Theriault, Lincoln, MA (US)

(73) Assignee: AEROSOL CONTAINMENT CONTAINER, LLC, Natick, MA (US)

( * ) Notice: Subject to any disclaimer, the term of this patent is extended or adjusted under 35 U.S.C. 154(b) by 975 days.

This patent is subject to a terminal disclaimer.

(21) Appl. No.: 17/851,375

(22) Filed: Jun. 28, 2022

(65) Prior Publication Data

US 2023/0210706 A1 Jul. 6, 2023

Related U.S. Application Data

(63) Continuation of application No. 17/565,850, filed on Dec. 30, 2021, now Pat. No. 11,406,550.

(51) Int. Cl.
*A61G 10/00* (2006.01)

(52) U.S. Cl.
CPC .................................. *A61G 10/005* (2013.01)

(58) Field of Classification Search
CPC .......................... A61B 90/40; A61B 2090/401
See application file for complete search history.

(56) References Cited

U.S. PATENT DOCUMENTS

| | | | |
|---|---|---|---|
| 2,915,074 | A | 12/1959 | Leon |
| 3,678,921 | A | 7/1972 | Brendgord et al. |
| 4,304,224 | A | 12/1981 | Fortney |
| 4,335,712 | A | 6/1982 | Trexler |
| 4,422,369 | A | 12/1983 | Smets |

(Continued)

FOREIGN PATENT DOCUMENTS

| | | | |
|---|---|---|---|
| WO | 2005037163 | A2 | 4/2005 |

OTHER PUBLICATIONS

International Application No. PCT/US2022/053519, International Search Report and Written Opinion mailed Apr. 18, 2023, 9 pages.

(Continued)

*Primary Examiner* — Thaddeus B Cox
(74) *Attorney, Agent, or Firm* — Kintner IP, LLC; Mary Frances Ludwig

(57) ABSTRACT

An aerosol containment enclosure is used to isolate an air mass immediately surrounding a patient known or suspected to have a disease which may be transmitted through the air. The enclosure cooperates with a patient support apparatus (PSA). In embodiments, a flexible rod supports a substantially aerosol impermeable covering and is connected to the PSA. The enclosure may be semi-rigid and collapsible to a predetermined collapsed shape. The enclosure may be rapidly erected around a patient in an ambulance or other treatment setting. Embodiments of couplers provide compatibility with a wide diversity of sized and shaped PSAs. One coupler is connectable to the PSA with a coupler end exposed along a frame and upwardly extensible toward a PSA surface. A connector extends from the flexible rod and engages with the coupler end. The coupler may be longitudinally or laterally adjustable along the PSA.

14 Claims, 16 Drawing Sheets

(56) References Cited

U.S. PATENT DOCUMENTS

| | | | | |
|---|---|---|---|---|
| 5,061,235 | A | 10/1991 | Hogan | |
| 5,342,121 | A | 8/1994 | Koria | |
| 5,864,767 | A | 1/1999 | Drumgoole et al. | |
| 5,950,625 | A | 9/1999 | Bongiovanni et al. | |
| 6,001,057 | A | 12/1999 | Bongiovanni et al. | |
| 6,241,653 | B1 | 6/2001 | Gauger et al. | |
| 6,321,764 | B1 | 11/2001 | Gauger et al. | |
| 6,461,290 | B1 | 10/2002 | Reichman et al. | |
| 7,481,234 | B1 | 1/2009 | Gustafson et al. | |
| 11,071,671 | B1 | 7/2021 | Theriault et al. | |
| 2002/0045796 | A1 | 4/2002 | O'Connor et al. | |
| 2002/0112754 | A1 | 8/2002 | Gauger et al. | |
| 2002/0133100 | A1 | 9/2002 | Paschal et al. | |
| 2004/0111008 | A1 | 6/2004 | Perlatti | |
| 2004/0236174 | A1 | 11/2004 | Boone et al. | |
| 2005/0004423 | A1 | 1/2005 | Shenosky et al. | |
| 2006/0247487 | A1 | 11/2006 | Arts et al. | |
| 2007/0056593 | A1 | 3/2007 | Kubicsko et al. | |
| 2008/0120919 | A1 | 5/2008 | VanBasten et al. | |
| 2009/0216069 | A1 | 8/2009 | Woodcock et al. | |
| 2010/0044372 | A1 | 2/2010 | Koumnikakis et al. | |
| 2013/0204074 | A1 | 8/2013 | Belval et al. | |
| 2014/0290162 | A1 | 10/2014 | Tanimoto | |
| 2014/0316455 | A1 | 10/2014 | Gnanashanmugam et al. | |
| 2016/0074268 | A1 | 3/2016 | Breegi et al. | |
| 2016/0115704 | A1 | 4/2016 | Burke | |
| 2016/0151218 | A1 | 6/2016 | Canty | |
| 2017/0231848 | A1 | 8/2017 | VanBasten | |
| 2018/0163978 | A1 | 6/2018 | Ziegler et al. | |
| 2018/0177654 | A1 | 6/2018 | Muscarello et al. | |
| 2019/0282317 | A1 | 9/2019 | Fields et al. | |
| 2019/0330874 | A1 | 10/2019 | Pescovitz | |
| 2019/0380901 | A1 | 12/2019 | Breegi | |
| 2021/0307871 | A1* | 10/2021 | Edalati | A61G 10/02 |
| 2021/0330413 | A1* | 10/2021 | Feeley | A61B 46/23 |
| 2021/0361375 | A1* | 11/2021 | Hartman | A61B 90/05 |
| 2023/0233393 | A1* | 7/2023 | Patmore | A61B 46/20 600/21 |

OTHER PUBLICATIONS

Ferno EMS Patient Shield—YouTube, https://www.youtube.com/watch?v=-uhi5M3k0CE, Pub'd Apr. 22, 2020.

Stryker Corporation, Emergency Relief Patient Cover (product brochure), Pub. Date: Apr. 28, 2020.

Ward et al., "AerosolIVE Tent: Compact Respiratory Isolation System", Apr. 2020, Michigan Center for Integrative Research. Attached. (Year: 2020).

Hill et al., Introducing the "Corona Curtain": an innovative technique to prevent airborne COVID-19 exposure during emergent intubations. Patient Saf Surg 14, 22 (2020). https://doi org/10.1186/s13037-020-00247-5. Attached. (Year: 2020).

Bassin et al., Rapid development of a portable negative pressure procedural tent. Int J Tuberc Lung Dis. Jul. 1, 2020 ;24(7):740-743. doi: 10.5588/ijtld.20.0317. PMID: 32718413. https://www.inspirerxllc.com/journal-2. Article Accepted Apr. 29, 2020.Attached. (Year: 2020).

D250 bagging film Data Sheet, De-comp composites, Inc., Mar. 15, 2006.Attached. (Year: 2020).

Patient Transfers and Body Mechanics. Cross Country University's Caregiver Safety Series. pp. 1, 6-7, 2013. Attached. https://www.mylearningcommunity.com/online_learni ng/custom/cctc/cgs09trans/media/CGStrans.pdf (Year: 2013).

International Application No. PCT/US2021/032437, International Search Report and Written Opinion mailed Sep. 2, 2021, 9 pages.

* cited by examiner

AEROSOL CONTAINMENT ENCLOSURE

CROSS REFERENCE TO RELATED APPLICATION

This application is a continuation of U.S. patent application Ser. No. 17/565,850, filed Dec. 30, 2021, now U.S. Pat. No. 11,406,550, which is hereby incorporated in its entirety.

BACKGROUND

SARS-CoV-2 (the virus which causes coronavirus, also referred to as COVID-19) and other pathogens may be spread via airborne transmission. There is a need to protect emergency first responders and healthcare workers from both known and unknown threats. It is desirable that enhanced protection for care personnel be deployable in facilities such as emergency rooms, nursing homes, assisted living facilities, or ambulances. It is further desirable that such protection be rapidly deployable, low cost, and disposable or easily cleaned and stored.

BRIEF SUMMARY OF THE EMBODIMENTS

An aerosol containment enclosure is used to isolate an air mass immediately surrounding a patient known or suspected to have a disease which may be transmitted through the air. The enclosure cooperates with a patient support apparatus, such as a stretcher or bed. In an exemplary configuration, an aerosol containment enclosure system cooperates with a patient support apparatus which has a frame having a length spanning a major dimension of the frame, and a first surface oriented to support the patient. The enclosure includes a flexible rod supporting a transparent, substantially aerosol impermeable covering. The enclosure is collapsible to a predetermined collapsed shape and self-erecting to a predetermined erect shape. The system includes a coupler having a strap terminating in a coupler end. The coupler is configured for connection to the patient support apparatus with the coupler end exposed along the length of the frame and upwardly extensible toward the first surface. In the erect shape, the enclosure is semi-rigid and has a head end, a foot end, and two opposing sides. Each of the two opposing sides has a flexible portion configured to be draped over the patient support apparatus. The flexible rod has a tip which is proximate the head end when the enclosure is in the erect shape, and a connector extensible from the flexible rod proximate the tip. The connector is configured for engagement with the coupler end.

According to one or more embodiments, at least one of the strap and the connector includes an elastomeric material.

According to one or more embodiments, the strap of the coupler is configured for positioning between the frame and the first surface of the patient support apparatus.

According to one or more embodiments, the frame has two opposing sides along the length, the strap of the coupler terminates in two coupler ends, each of the coupler ends is configured for exposure along one of the two opposing sides of the frame and upwardly extensible toward the first surface; and the flexible rod has two tips and a connector extensible from each of the two tips, each connector configured for engagement with one of the coupler ends. In some embodiments, the strap has a length between the two coupler ends, and the length of the strap is adjustable.

According to one or more embodiments, the frame has two opposing sides along the length. The enclosure includes two flexible rods, and each flexible rod has two tips and a connector extensible from each of the two tips. The system further includes two couplers, the strap of each coupler terminating in two coupler ends, each of the coupler ends is configured for exposure along one of the two opposing sides of the frame and upwardly extensible toward the first surface; and each connector is configured for engagement with one of the coupler ends.

According to one or more embodiments, the connector is configured for direct attachment to the patient support apparatus.

According to one or more embodiments, the connector is a band, a strap, or a cord.

According to one or more embodiments, the connector is least partially formed of a natural or synthetic elastomeric material.

According to one or more embodiments, the strap of the coupler includes a slide or a buckle configured to adjust tension on the strap.

According to one or more embodiments, the coupler includes a toggle, a hook, a latch, or a clip.

According to one or more embodiments, an aerosol containment enclosure system for cooperation with a patient support apparatus has a frame and a first surface, the frame has a length spanning a major dimension of the frame, the first surface is oriented to support the patient, the system including:

- an enclosure including a flexible rod supporting a transparent, substantially aerosol impermeable covering;
- the enclosure being collapsible to a predetermined collapsed shape and self-erecting to a predetermined erect shape;
- a coupler having a recess, the coupler configured for connection to the first surface of the patient support apparatus with the recess oriented away from the first surface;
- wherein in the erect shape the enclosure is semi-rigid and has a head end, a foot end, and two opposing sides, each of the two opposing sides having a flexible portion configured to be draped over the patient support apparatus; and
- wherein the flexible rod has a free tip which is proximate the head end when the enclosure is in the erect shape, the free tip sized and dimensioned for insertion into the recess of the coupler.

According to one or more embodiments, the recess of the coupler has a bore and two wings defining the bore and directly extending therefrom; and, the free tip of the flexible rod is shaped complementary to the recess. In some embodiments, a width of the bore is tapered to narrow from a bore top to a bore bottom.

According to one or more embodiments, the coupler connectable to a strap.

According to one or more embodiments, the patient support apparatus has two opposing frame sides along the length, and has a width extending laterally between the two opposing frame sides, wherein the coupler is adjustably positionable laterally on the first surface, in the direction of the width. In some embodiments, the coupler is adjustably positionable longitudinally on the first surface, in the direction of the length.

According to one or more embodiments, the strap has an adjustable strap length.

According to one or more embodiments, the coupler has a bottom face including a plurality of gripping protrusions, the plurality of gripping protrusions configured to contact the first surface.

According to one or more embodiments, an aerosol containment enclosure system for cooperation with a patient support apparatus has a frame and a first surface; the frame has a length spanning a major dimension of the frame; and the first surface is oriented to support the patient. The system includes:

- an enclosure including a flexible rod supporting a transparent, substantially aerosol impermeable covering;
- the enclosure being collapsible to a predetermined collapsed shape and self-erecting to a predetermined erect shape;
- wherein in the erect shape the enclosure is semi-rigid and has a head end, a foot end, and two opposing sides, each of the two opposing sides having a flexible portion configured to be draped over the patient support apparatus; and
- wherein the flexible rod has a tip which is proximate the head end when the enclosure is in the erect shape, and a connector extensible from the flexible rod proximate the tip, the connector configured for configured for direct attachment to the patient support apparatus.

According to one or more embodiments, the connector is a band, a strap, or a cord.

According to one or more embodiments, the connector is configured for a second attachment to the flexible rod when directly attached to the patient support apparatus.

According to one or more embodiments, the connector has an adjustable length.

These and other aspects of the embodiments will be better appreciated and understood when considered in conjunction with the following description and the accompanying drawings. The following description, while indicating various embodiments and details thereof, is given by way of illustration and not of limitation. Many substitutions, modifications, additions, or rearrangements may be made within the scope of the embodiments, and the embodiments may include all such substitutions, modifications, additions, or rearrangements.

BRIEF DESCRIPTION OF THE DRAWINGS

Non-limiting and non-exhaustive embodiments of the aerosol containment enclosure are described with reference to the following figures, wherein like reference numerals refer to like parts throughout the various views unless otherwise specified.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. Also, common but well-understood elements that are useful or necessary in a commercially feasible embodiment are often not depicted in order to facilitate a less obstructed view of these various embodiments.

DETAILED DESCRIPTION OF THE INVENTION

Figure 1:
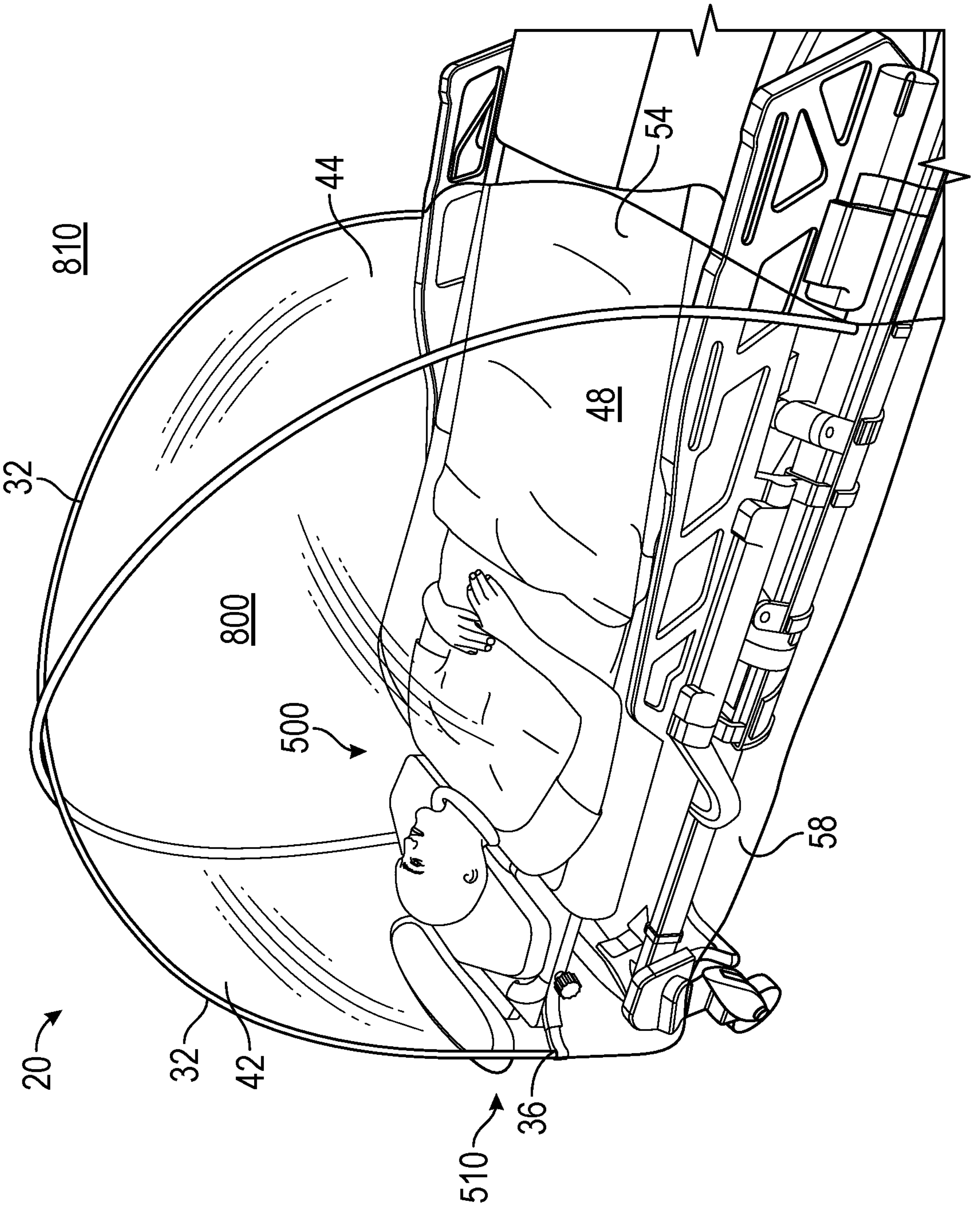
FIG. 1 is a perspective view of an embodiment of an aerosol containment enclosure system.
Figure 2:
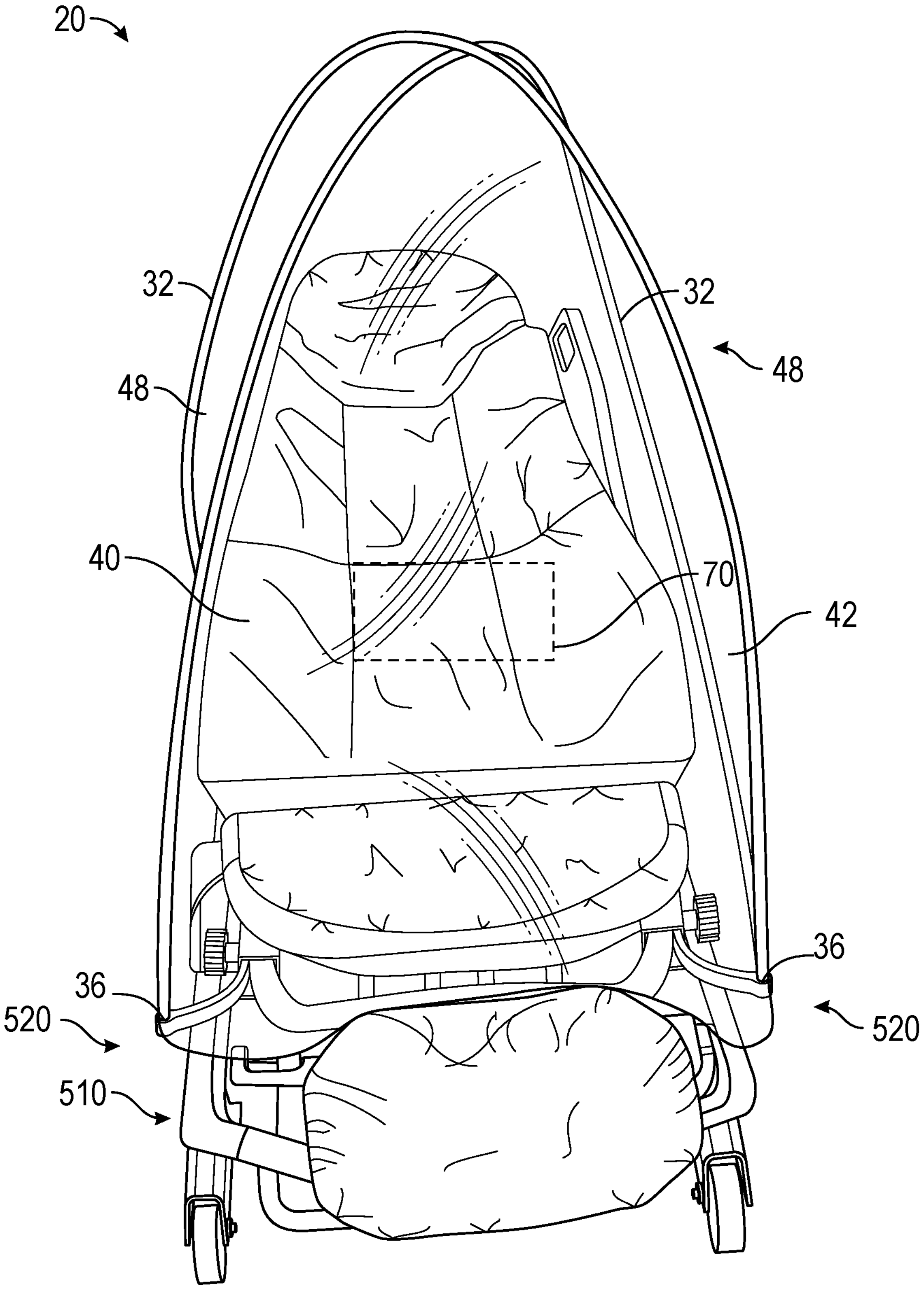
FIG. 2 is a top view of the FIG. 1 embodiment.
Figure 3:
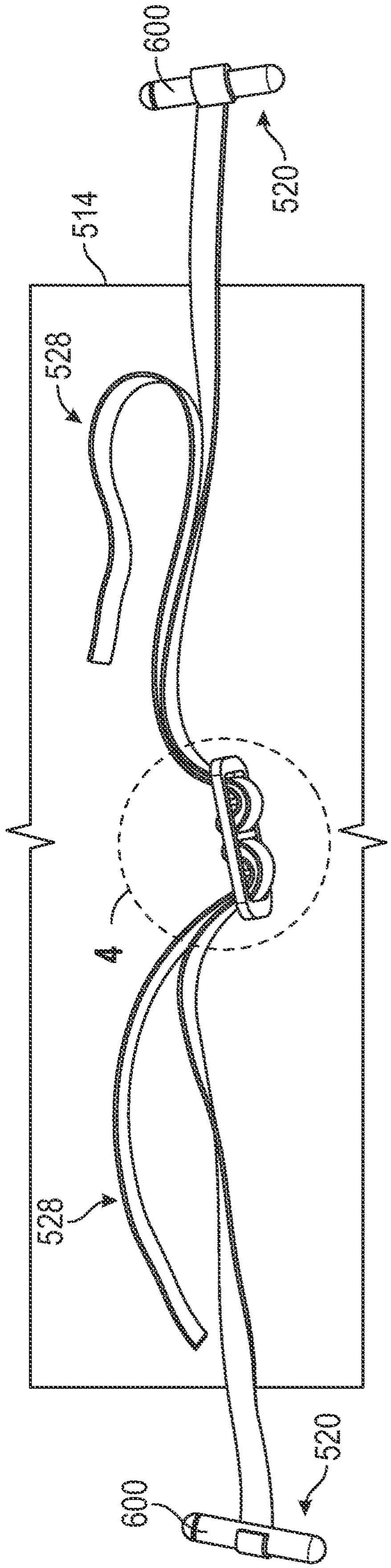
FIG. 3 is a top view of an embodiment of a coupler of the system.
Figure 4:
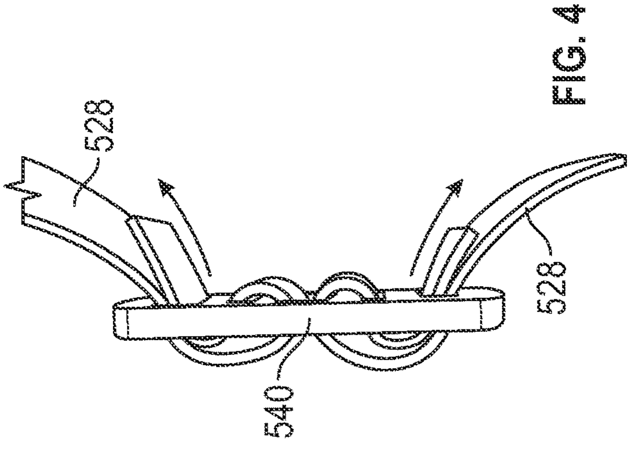
FIG. 4 is an enlarged detail view of area 4 of FIG. 3.
Figure 5:
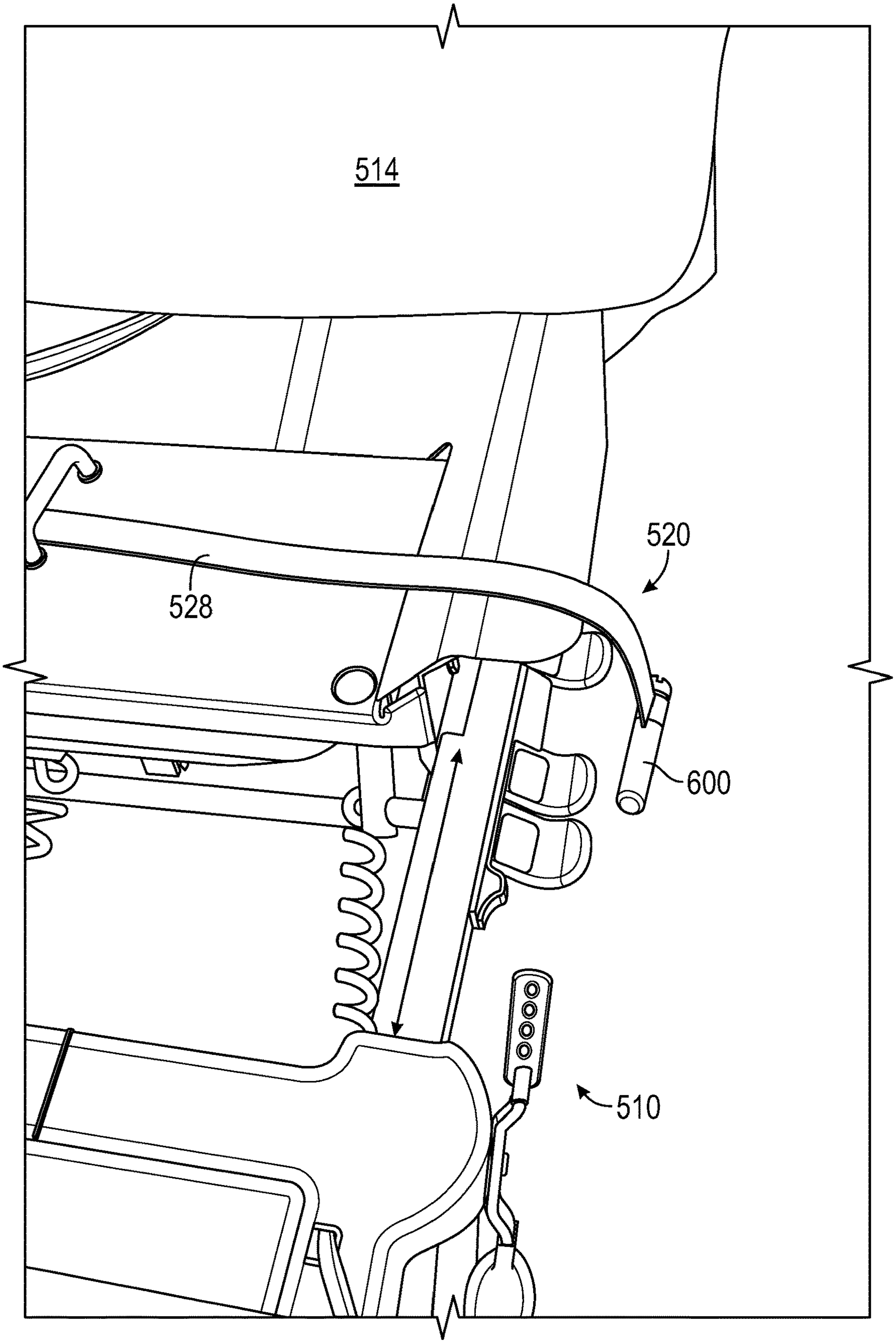
FIG. 5 is a detail view of an embodiment of the coupler with a patient support apparatus.

FIGS. 1 and 2 show perspective and top views, respectively, of an embodiment of an aerosol containment enclosure generally designated as 20. Enclosure 20 is shown in use with a patient 500 supported on a cooperating patient support apparatus (PSA) 510, such as a stretcher, gurney, or bed. Enclosure 20 includes one or more flexible rods 32 which support a covering 40 above the patient. Covering 40 is substantially aerosol impermeable; in other words, covering 40 substantially prevents transfer of aerosols between an air mass 800 inside the enclosure and an adjacent air mass 810 surrounding the exterior of the enclosure. In this manner, the enclosure significantly reduces the risk to medical personnel and other attendants of exposure to potentially hazardous aerosols expelled by the patient.

As used herein, the term “aerosol” refers to any liquid or solid particles suspended in air, regardless of droplet size, composition, or potentially hazardous properties. Aerosols may be created by a patient during common human activities such as breathing, talking, coughing, or sneezing. Aerosols may also be created during certain medical procedures such as intubation, other respiratory treatments like Bi-PAP, CPAP, or nebulized medication delivery, or surgery.

Enclosure 20 is semi-rigid when in an erect position, as shown for example in FIGS. 1-2. As used herein, the term “semi-rigid” means being neither entirely flexible nor entirely rigid; a semi-rigid element may include portions that are flexible or rigid. In the erect position enclosure 20 has a rigid portion in the region of flexible rod 32. The rigid portion includes a head end 42 configured for placement behind the head of the patient; a foot end 44 opposite the head end; and two opposing sides 48 which extend from head end 42 toward foot end 44 and at least partially cover the patient's torso.

In the erect shape, foot end 44 and two opposing sides 48 may each have a flexible portion which is sized to be draped over patient 500 or patient support apparatus 510. In embodiments, flexible portion 54 of foot end 44 extends beyond flexible rod 32 in a direction generally away from head end 42. Flexible portion 54 may cover some or part of the patient's torso or legs, and may be arranged under a blanket or sheet to further reduce air transfer.

One or both of the two opposing sides 48 may include a flexible portion 58 which extends below flexible rod 32, and may extend over a support surface or railing of the patient support apparatus. Flexible portions 58 may be folded with a sheet, such as a bed linen, blanket, paper or plastic sheeting; or other covering for the patient support apparatus, which may further reduce transfer of air. Folding flexible portions 58 with the sheet may be useful to transfer the patient with the enclosure between a first and second patient support apparatus, for example, as described in U.S. Pat. No. 11,071,671 which is incorporated by reference as if fully recited herein.

Covering 40 may be a substantially transparent sheet of material. A high degree of transparency improves visibility both for the caregiver and the patient, which may facilitate patient monitoring, simplify performing medical procedures with the enclosure in place, and reduce patient anxiety. In some embodiments, the covering may be aerosol impermeable. Materials suitable for covering 40 include polyvinyl chloride, thermoplastic polyurethane, or linear low-density polyethylene. The semi-rigid nature of the enclosure may also improve transparency, since within the rigid portion the covering will have substantially no gathered or folded regions. In embodiments, the covering is formed of a material having a thickness of between about 0.002 inches and about 0.008 inches. In embodiments, the covering may include a portal 70 that provides access to an interior of the enclosure and that restricts transfer of aerosols out of the interior.

Flexible rod 32 may be a flexible plastic or metal rod, and may be segmented. Multiple flexible rods 32 may be connected to one another by joints or clips. Flexible rod 32 may for example have a diameter of 1/16 inch, 1/8 inch, or 1/4 inch. The flexible rod may include the following materials: polycarbonate, acrylic, polyvinylchloride (PVC), polyethylene terephthalate glycol-modified (PETG), polytetrafluoroethylene (PTFE), polypropylene, acrylonitrile butadiene styrene (ABS), nylon, acetal, ultra-moisture-resistant polychlorotrifluoroethylene (PCTFE), hard fiber, glass-filled polymer such as polyethylene terephthalate (PET), fiberglass, fiberglass-epoxy laminate, or stainless steel.

The bottom of enclosure 20 is open when the enclosure is expanded and not attached to a patient support apparatus. The open bottom allows enclosure 20 to be placed over the patient and connected to the patient support apparatus. The open bottom may be bounded by flexible portions 54 and 58 which reduce air flow out of the enclosure. A flexible portion may also be present at head end 42.

Flexible rod 32 has a connector 36 which is located near the head end when the enclosure is in the erect position. Connector 36 is structured for attachment to patient support apparatus 510. Multiple connectors 36 are present in some embodiments, and some connectors may not be near the head end of the enclosure. In some embodiments, connector 36 may attach directly to the patient support apparatus. Embodiments of connector 36 suitable for direct attachment to the patient support apparatus include a band, a strap, a cord, or a hook and loop fastener. Embodiments of connector 36 cooperate with a coupler 520 connected to the patient support apparatus. Exemplary embodiments of connector 36 and coupler 520 are described in detail below.

Example 1

In the embodiment of FIGS. 3-6, the enclosure is secured to PSA 510 (shown as a hospital bed) with pairs of couplers 520 that are connected to one another by at least one strap 528. Strap 528 may be adjustable to provide tension, such as an elastomeric connection, so that tension is maintained between the two couplers The mattress has a first surface 514 (in this case, a top surface) which is oriented to support the patient. In other cases, first surface 514 may be for example a cushion, a pad, or a support surface of a gurney.

Strap 528 of coupler 520 is shown positioned between the frame of PSA 510 and the first surface 514 (e.g., the strap may be located underneath the mattress). Two couplers 520 may be provided, each coupler 520 may have a coupler end 600 which may each be configured for exposure along one of the two opposing sides of the frame and upwardly extensible toward the first surface (see also FIGS. 1 & 2). Couple ends 600 may include a toggle (as shown), or may alternately include a hook, a latch, a clip, or another type of fastener.

The paired coupler ends may be placed opposite each other with a strap 528 between the two couplers ends; strap 528 may be adjustable (e.g., have an adjustable length) so that tension is maintained between the two coupler ends pulling them inward toward the center of the mattress. In this example, each coupler 520 has a strap 528 extending therefrom. The two straps are joined with a slide 540 which allows the extension length of each strap to be adjusted, such as by pulling each strap 528 along the directional arrows of FIG. 4. Slide 540 may be one or more loops, a buckle, or another device useful to adjust the length of a connected tensioning strap. When used with a PSA, slide 540 may first be adjusted to the desired length and then placed beneath the mattress (see FIG. 5).

Figure 6:
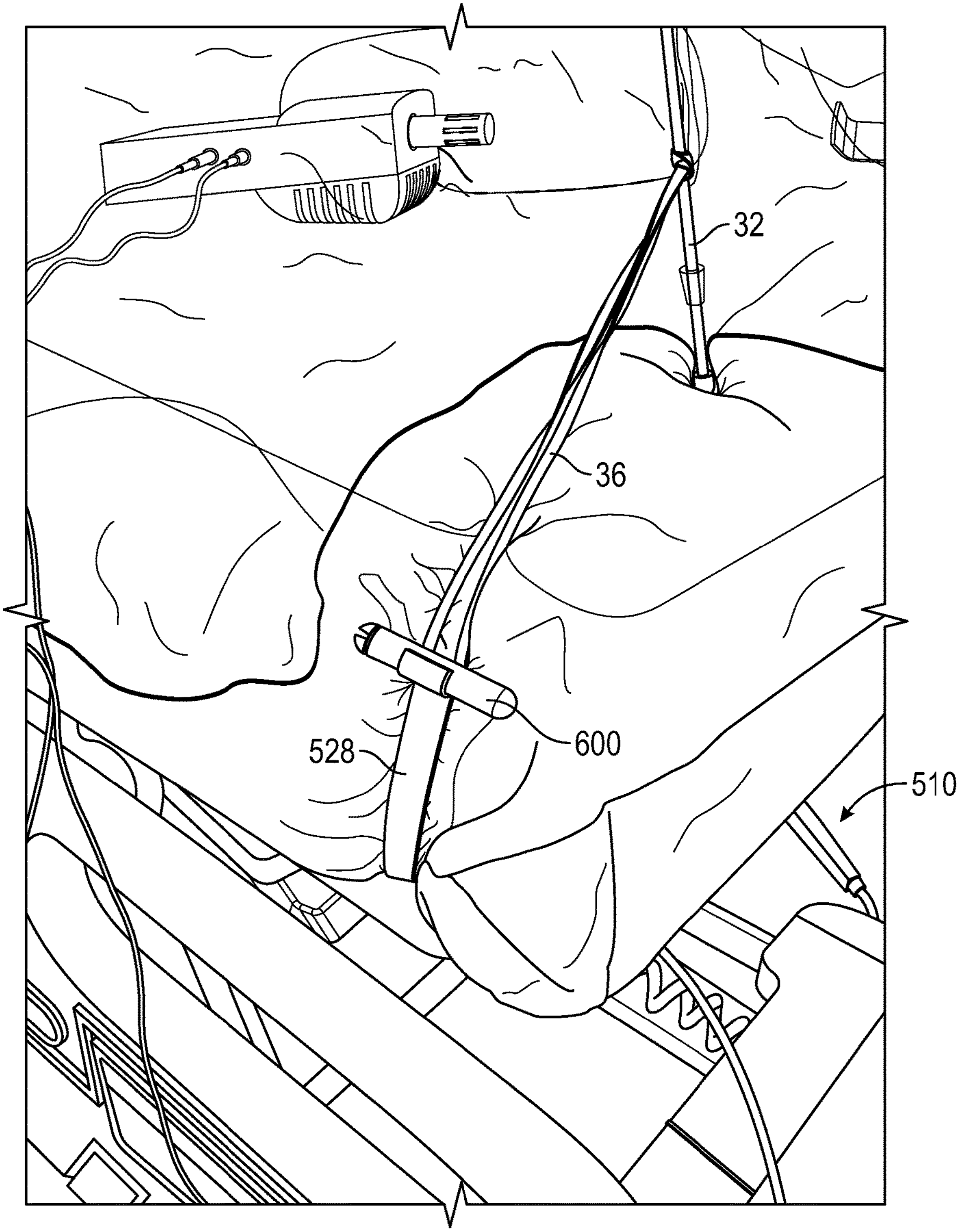
FIG. 6 is a detail view of an embodiment of the system with a patient support apparatus.

The couplers of this example may be used with an elastomeric connector 36 on the rods 32 of the enclosure, to firmly secure the enclosure to a mattress surface (see FIGS. 2 & 6). Connector 36 may be at least partially formed of a natural or synthetic elastomeric material. Each connector 36 may be engaged with one of the coupler ends 600, e.g. by stretching elastomeric connector 36 away from flexible rod 32 and looping the connector around a coupler end 600 or passing coupler end 600 through an aperture of the connector.

This embodiment allows adjustments to the length of the strap to be quickly and easily made in the field. The range of adjustment provided can accommodate PSAs having mattresses or patient support surfaces of many different widths and thicknesses. Once the couplers are in place on the PSA, attaching the enclosure and connectors 36 does not interfere with normal operations of the PSA, such as raising or lowering the bed or the side rails, adjusting the tilt, or positioning various sections of adjustable beds.

Example 2

Figure 7:
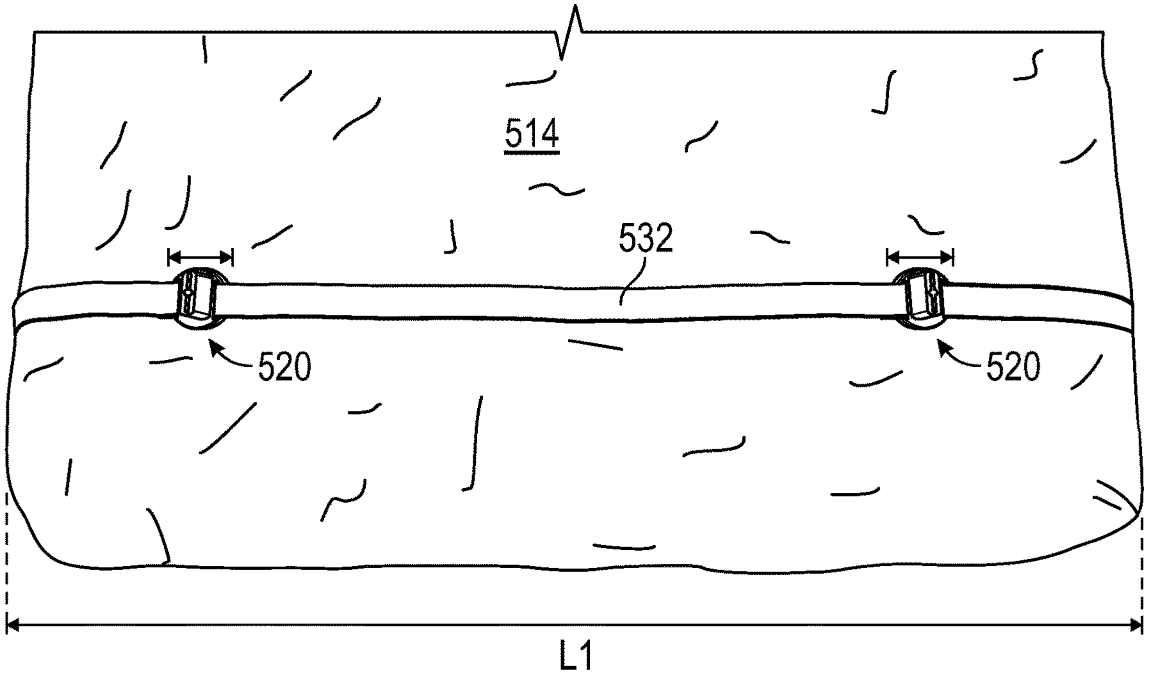
FIG. 7 is a top view of another embodiment of the coupler.
Figure 8:
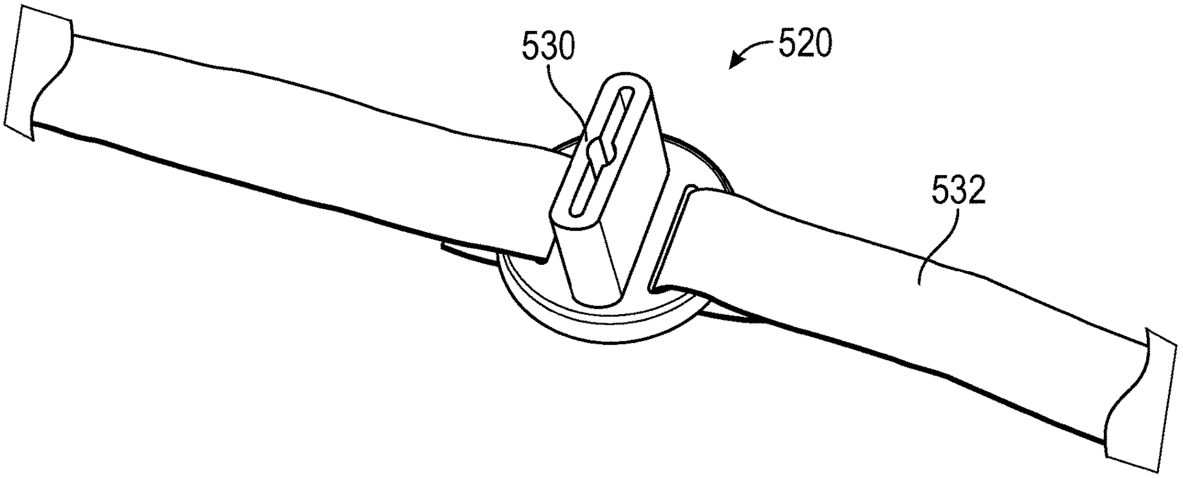
FIG. 8 is a partial enlarged perspective view of the coupler of FIG. 7.

In the embodiment of FIGS. 7-8, two couplers 520 are attached to a strap 532, which wraps fully around and under the mattress. The couplers 520 are thereby connected to the first surface 514 of the patient support apparatus. Strap 532 may be flat, flexible, and adjustable. Strap 532 may include a quick release buckle for rapid installation and removal. Strap 532 may include a tensioning buckle to cinch and secure the strap around the mattress, creating high tension in the strap and preventing the strap and couplers from moving on the mattress while the enclosure is in use.

Couplers 520 include a recess 530 which is sized and dimensioned to receive a free tip 35 (see FIG. 22) of flexible rod 32. (The connector in this case is the free tip 35 of rod 32.) Recess 530 is oriented away from the first surface 514 (e.g., top-facing). In this manner the enclosure may be readily attached to the patient support apparatus and may also be readily removed without damaging the enclosure or coupler.

Couplers 520 may be connectable to strap 532, for example by passing the strap through one or more slots in the coupler. In the shown configuration, coupler is adjustably positionable on the first surface in a lateral direction, (i.e., along a width L1, between two opposing frame sides of the PSA). Positioning the couplers in the lateral direction may simplify installation (by reducing tension on the enclosure) and allow tension on rods 32 to be increased after the enclosure is connected to the couplers.

In another embodiment, two straps 532 each may be used with a total of four couplers. One strap may be located near each of the head end and the foot end of the enclosure.

Example 3

Figure 9:
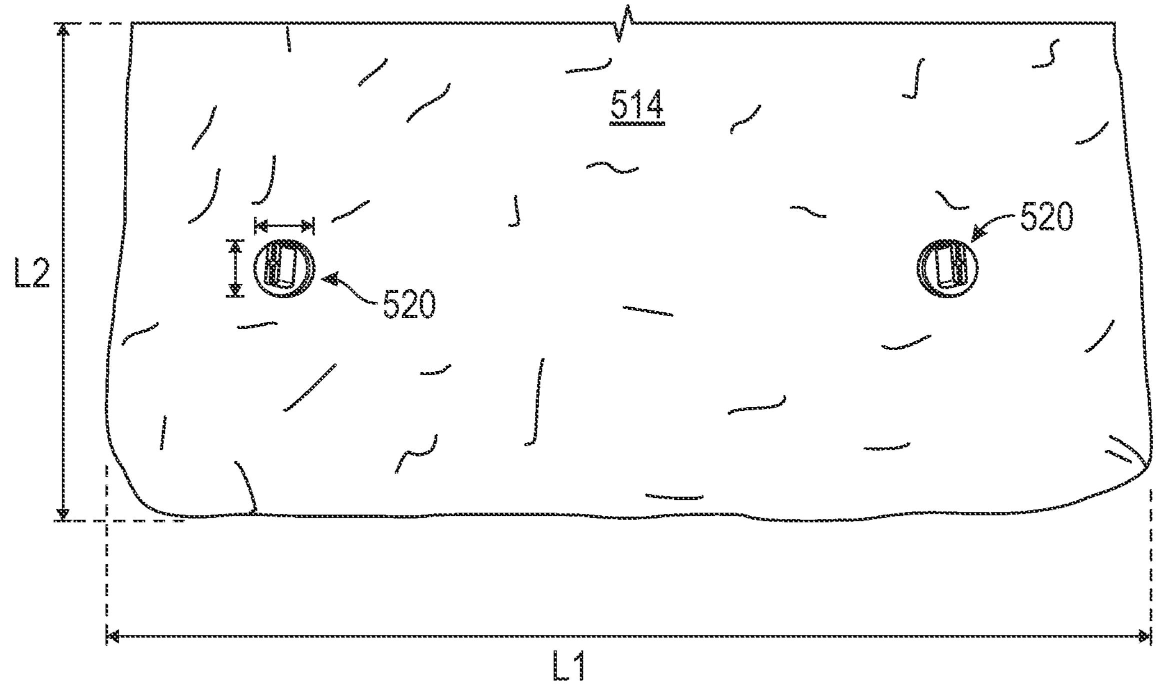
FIG. 9 is a top view of another embodiment of the coupler.
Figure 10:
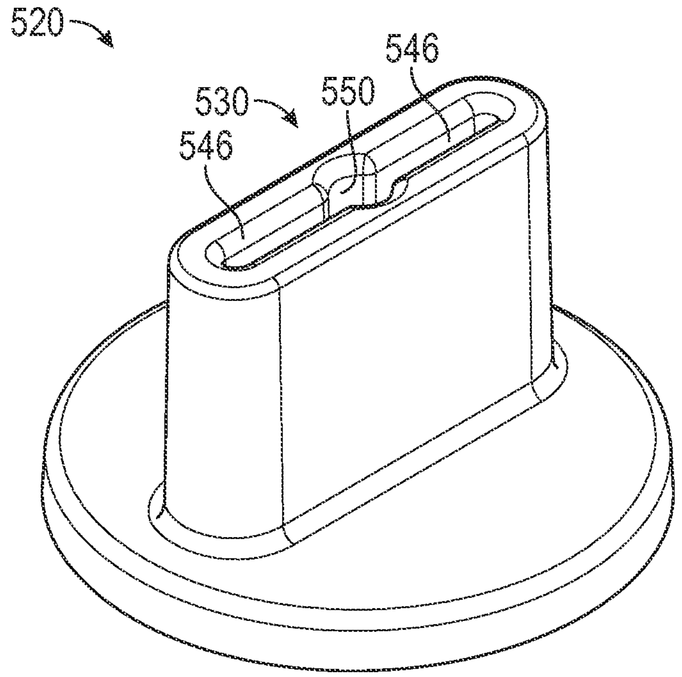
FIG. 10 is an enlarged upper perspective view of the coupler of FIG. 9.
Figure 11:
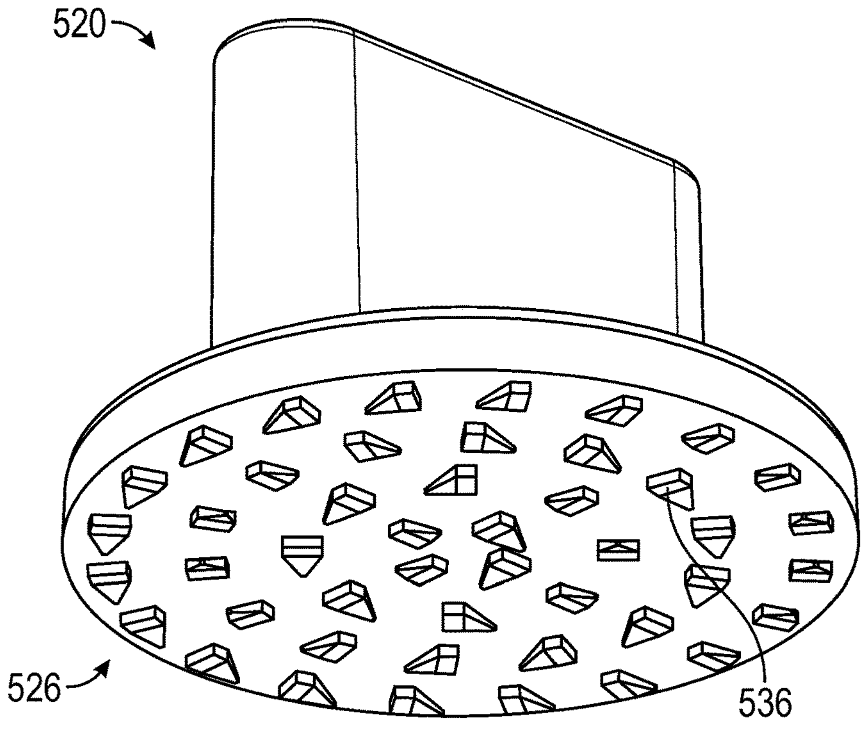
FIG. 11 is an enlarged lower perspective view of the coupler of FIG. 9.
Figure 12:
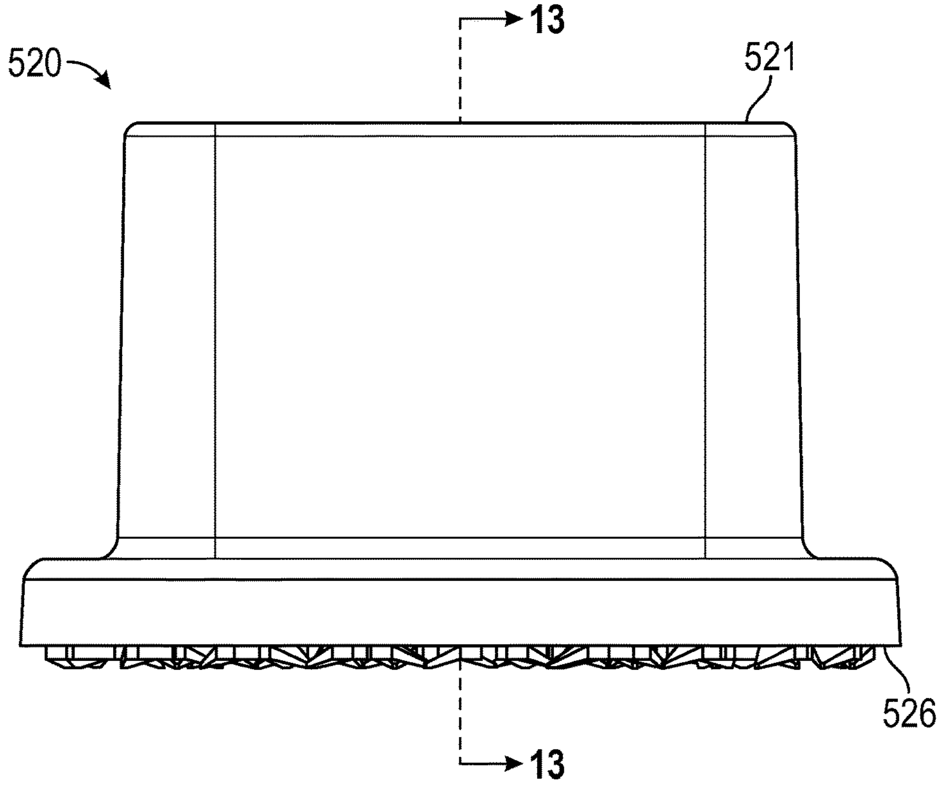
FIG. 12 is an enlarged side view of an embodiment of the coupler.
Figure 13:
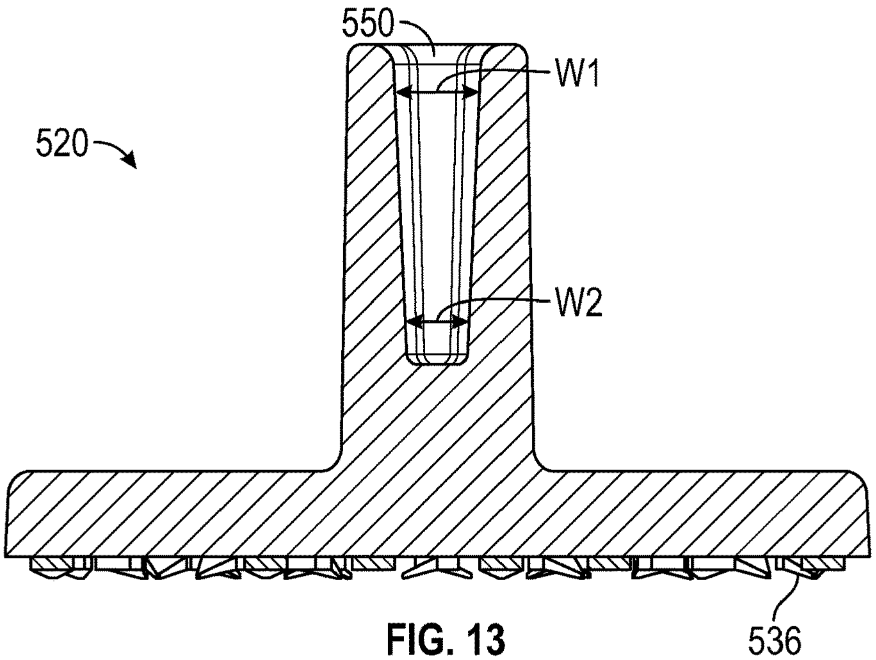
FIG. 13 is a cross-sectional view along line 13-13 of FIG. 12.

In the embodiment of FIG. 9, two couplers 520 are directly attached to the first surface 514 of the patient support apparatus. FIGS. 10-12 are top, and upper and lower perspective views, respectively, of coupler 520. FIG. 13 is a cross-sectional view along line 13-13 of FIG. 12. Coupler 520 has a bottom face 526 including a plurality of gripping protrusions 536. The plurality of gripping protrusions 536 are configured to directly grip a surface, for example, pressing and/or twisting the bottom face against a surface may cause the protrusions to become at least partially embedded the material of the surface.

The coupler of this embodiment is adjustably positionable on the first surface both laterally (along the width L1) and longitudinally (along the length L2, which spans the major dimension of the PSA frame). In other words, this type of coupler may be freely positioned on the first surface 514, as it is not connected to a strap or another portion of the PSA. This feature allows rapid deployment of the system.

An embodiment having four couplers 520 as described above may have each coupler positioned near a corner of the enclosure.

Figure 22:
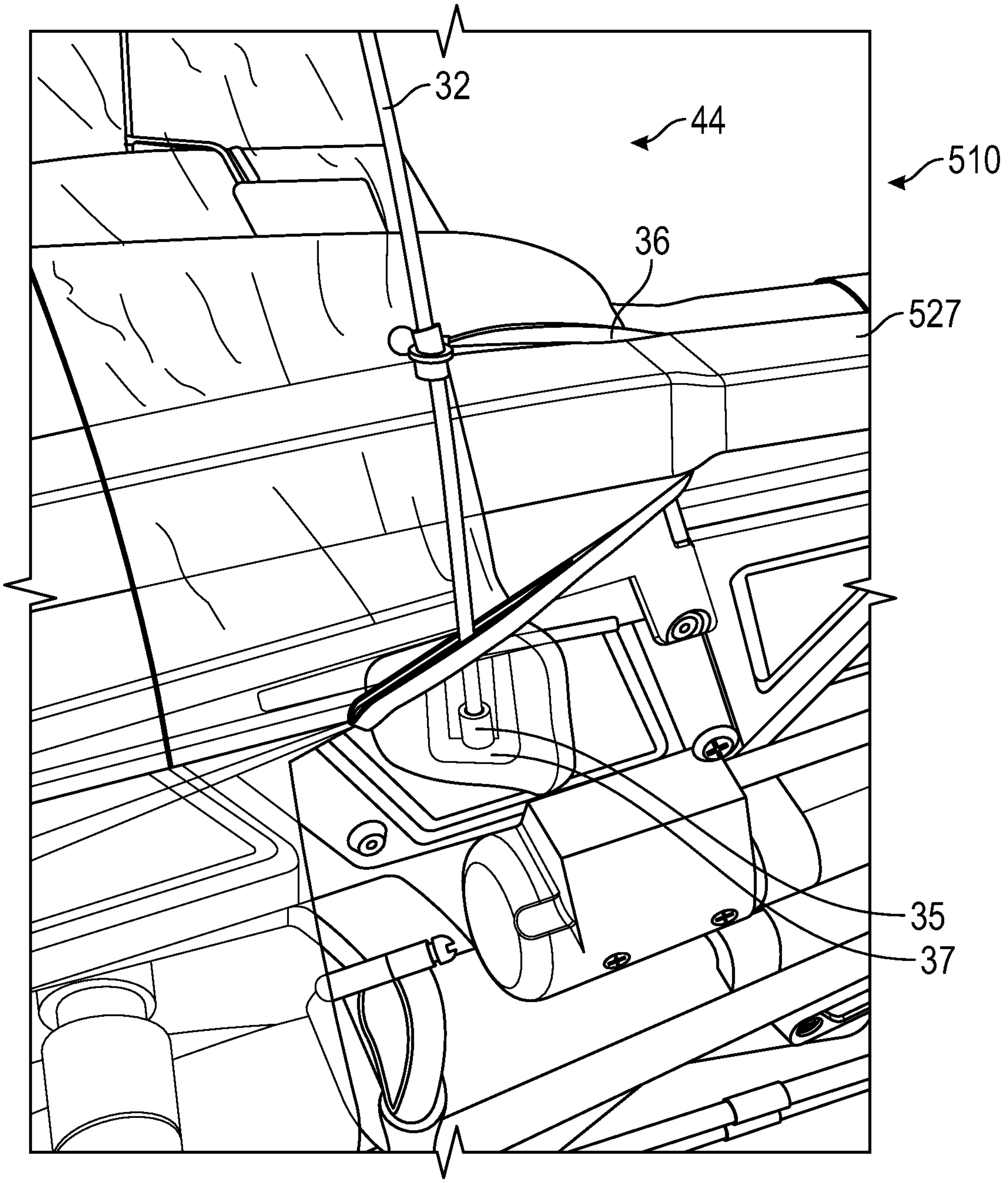
FIG. 22 is a detail view of an embodiment of the system, seen from a foot end of the enclosure.

Couplers 520 include a recess 530 which is sized and dimensioned to receive a free tip 35 (see FIG. 22) of flexible rod 32. Referring to FIGS. 10 & 13, recess 530 has a bore 550 and two wings 546 defining the bore and directly extending therefrom. In embodiments, free tip 35 of the flexible rod may be shaped complementary to the recess. As seen in FIG. 22, a reinforced edge 37 around free tip 35 may be shaped and dimensioned to be closely received by recess 530. In some embodiments (see FIG. 13), bore 550 has a width which is tapered to narrow from a bore top (width W1) to a bore bottom (width W2); i.e. W2<W1. This feature allows free tip 35 to be inserted in bore 550 to an appropriate depth to tightly hold the rod in the coupler.

Example 4

Figure 14:
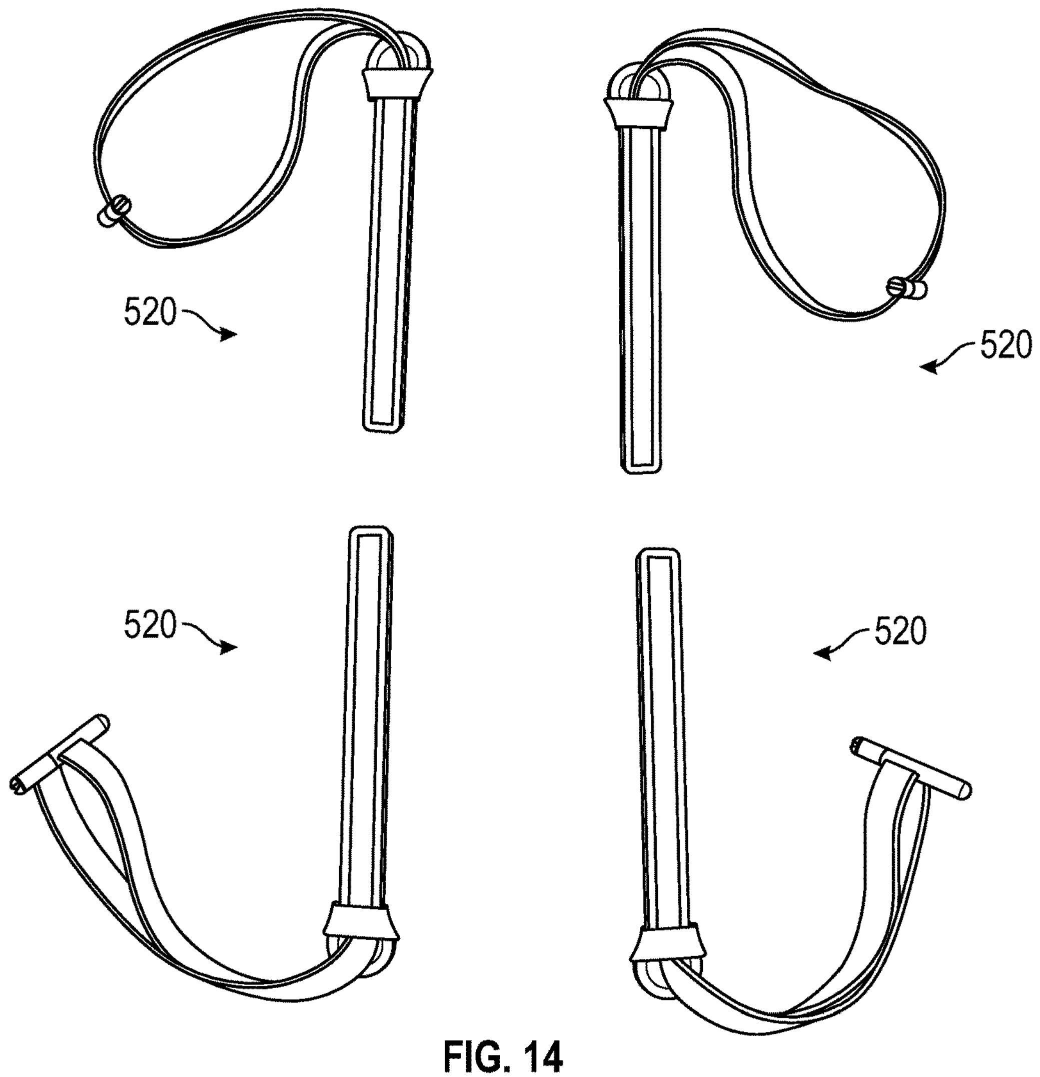
FIG. 14 is a top view of an embodiment having four couplers.
Figure 15:
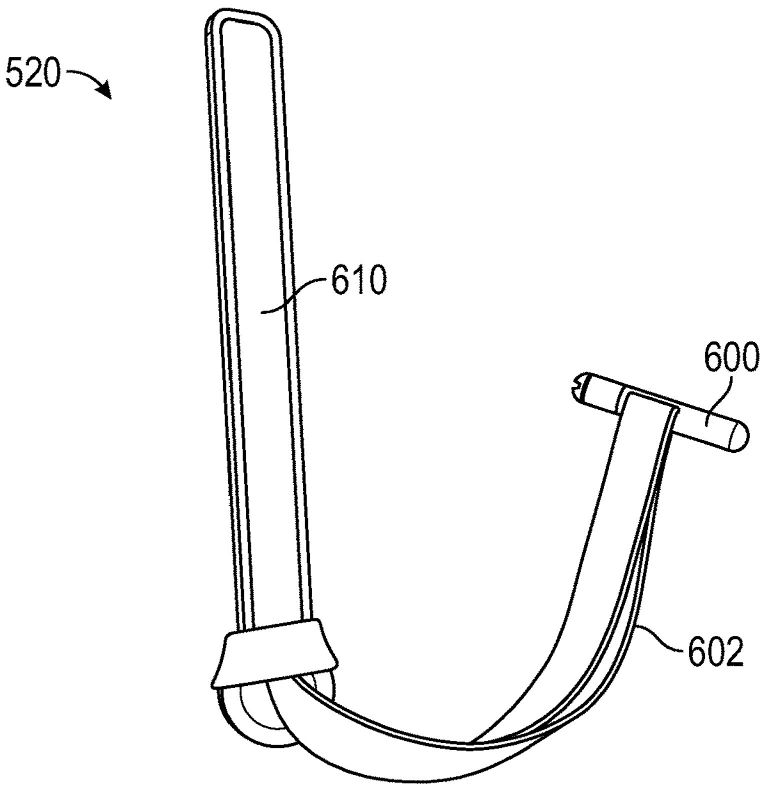
FIG. 15 is an enlarged view of a coupler of the FIG. 14 embodiment.
Figure 16:
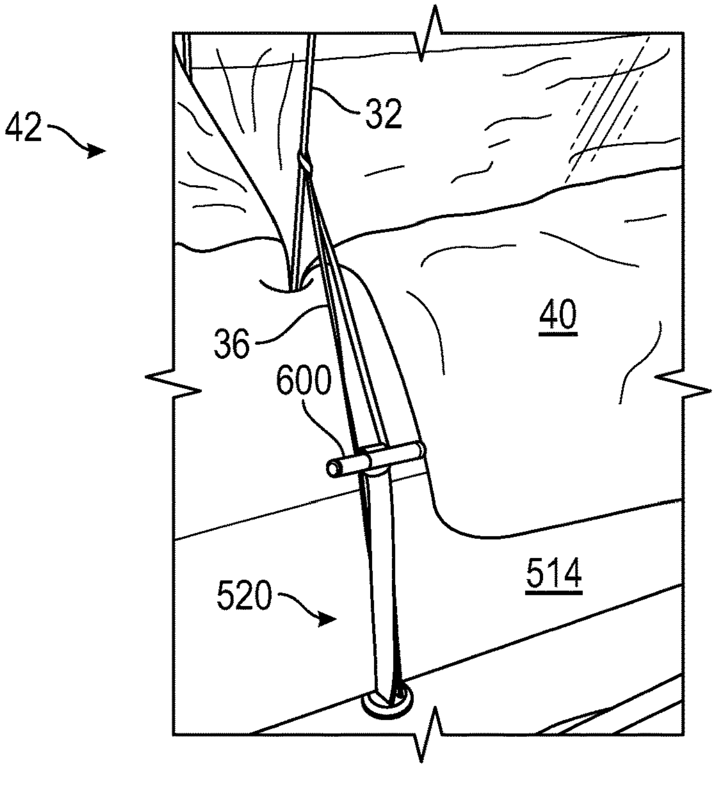
FIG. 16 is a detail view of a system in accordance with the FIG. 14 embodiment.
Figure 17:
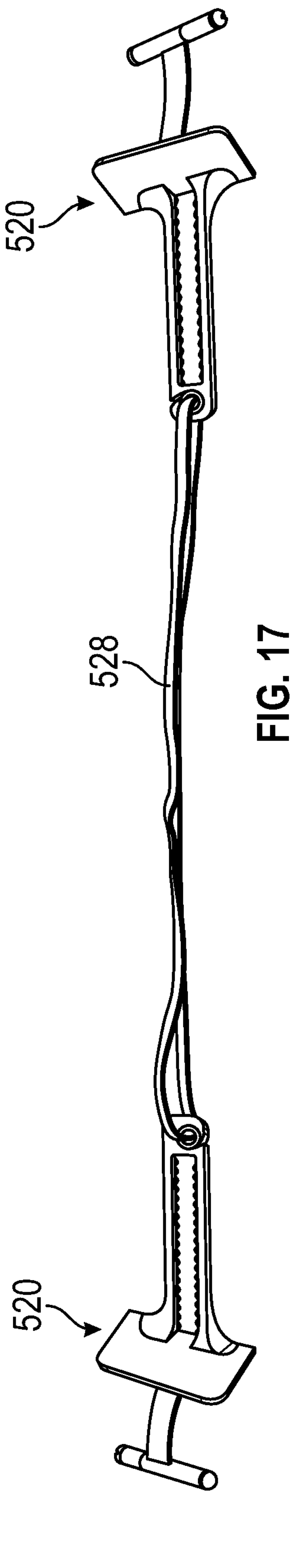
FIG. 17 is a top view of an embodiment of a coupler of the system.
Figure 18:
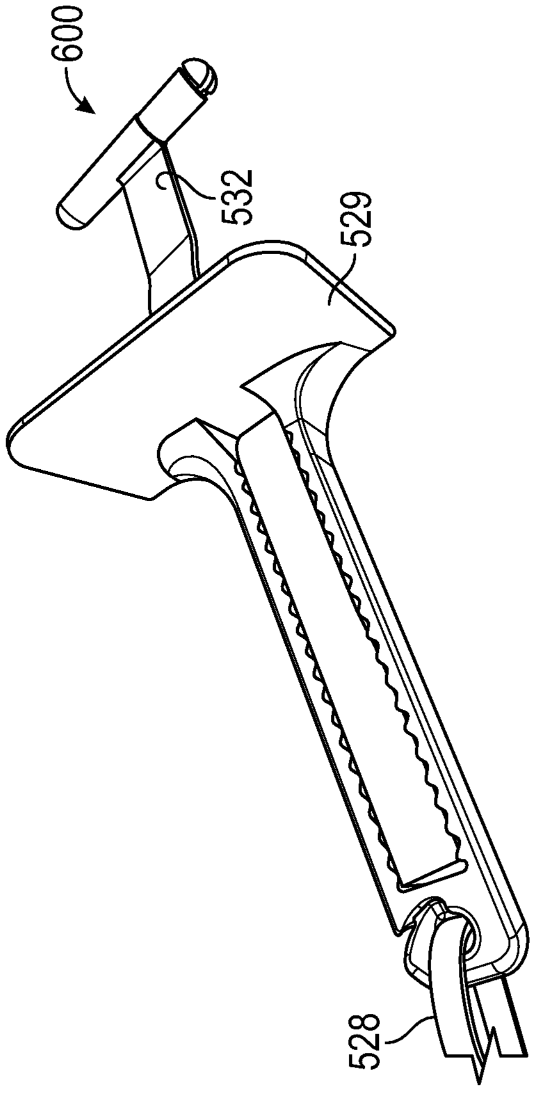
FIG. 18 is an enlarged partial view of the coupler of FIG. 17.

In the embodiment of FIGS. 14-16, connectors 36 are elastomeric bands attached to each end of flexible rod 32. Four of connector 36 are present in this embodiment, although an embodiment with two connectors is also envisioned. PSA 510 is a bed having a mattress with a first surface 514 on top of a frame 512, or other support structure. Four corresponding couplers 520 are inserted between the mattress and the support structure.

As seen in FIGS. 14 & 15, couplers 520 each include a toggle (coupler end 600) secured to a rigid plastic bar 610, which serves to anchor the coupler underneath the mattress. One coupler may be positioned near each corner of the enclosure for attachment near head end 42 (see FIG. 16) and foot end 44.

This embodiment is seen as being particularly useful for wide, flat bed surfaces. Couplers 520 may be positioned longitudinally along the mattress by lifting the side of mattress to move the coupler along the length of the PSA. The weight of the mattress holds the coupler in position. By extending the elastomeric band 36 from rod 32 and placing it over the toggle 600 attached to coupler 520, a downward force is applied through the rod which holds the enclosure securely to the surface of the bed.

The toggles and under-mattress anchors (couplers) are meant to be durable, reusable equipment, while connectors 36 are disposable, along with covering 40 and rods 32.

Example 5

In the embodiment of FIGS. 17-20, the enclosure is secured to PSA 510 (shown as a bed) with pairs of couplers 520 that are connected to one another underneath a mattress. Four couplers 520 are provided in two pairs; in each pair one coupler 520 is used on each side of the mattress. The paired couplers are placed opposite each other with a strap 528, which may be an elastomeric connection or other tensionable strap, between the two couplers, so that tension is maintained between the two couplers pulling them inward toward the center of the mattress.

Figure 19:
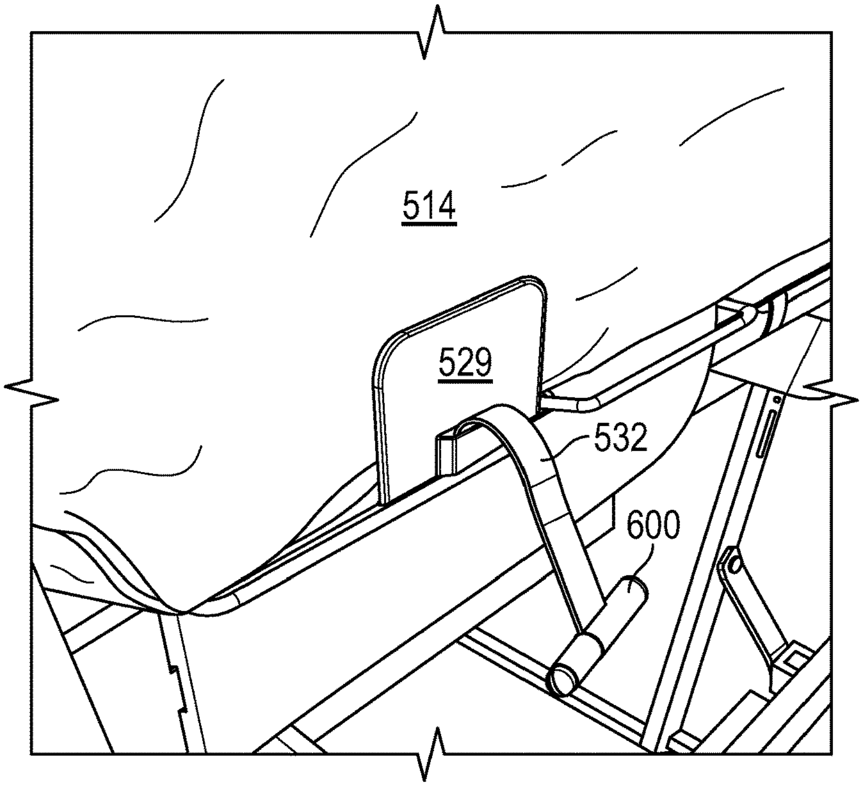
FIG. 19 is a detail view of the embodiment of FIG. 17 with a patient support apparatus.
Figure 20:
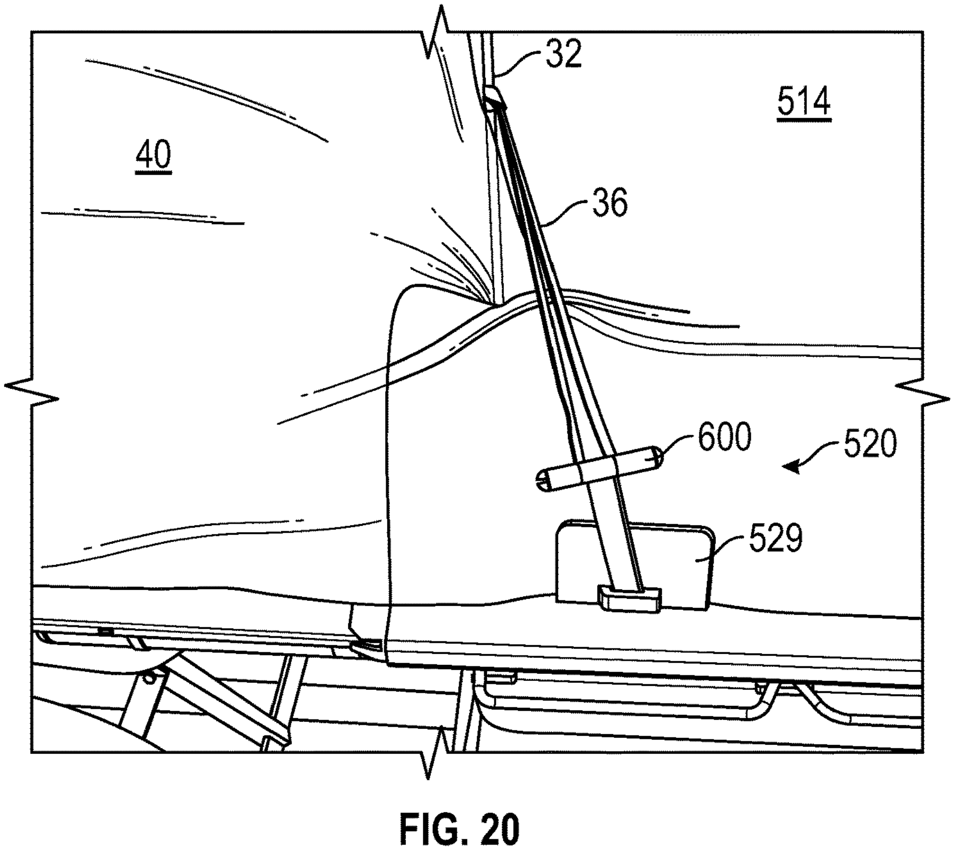
FIG. 20 is a detail view of a system in accordance with the FIG. 17 embodiment.

A rigid vertical stop 529 is provided on each coupler 520, and is configured to abut the side of the mattress, as shown in FIGS. 19 & 20. Stop 529 prevents the coupler from sliding beneath the mattress due to the tension of the connecting strap 528.

A toggle (coupler end 600) is attached to the ends of the coupler. The couplers of this example may be used with an elastomeric connector on the rods 32 of the enclosure, to firmly secure the enclosure to a mattress surface (see FIGS. 19 & 20).

An additional strap 532 is present between stop 529 and coupler end 600. Strap 532 may be flat, flexible, and/or adjustable.

Example 6

Figure 21:
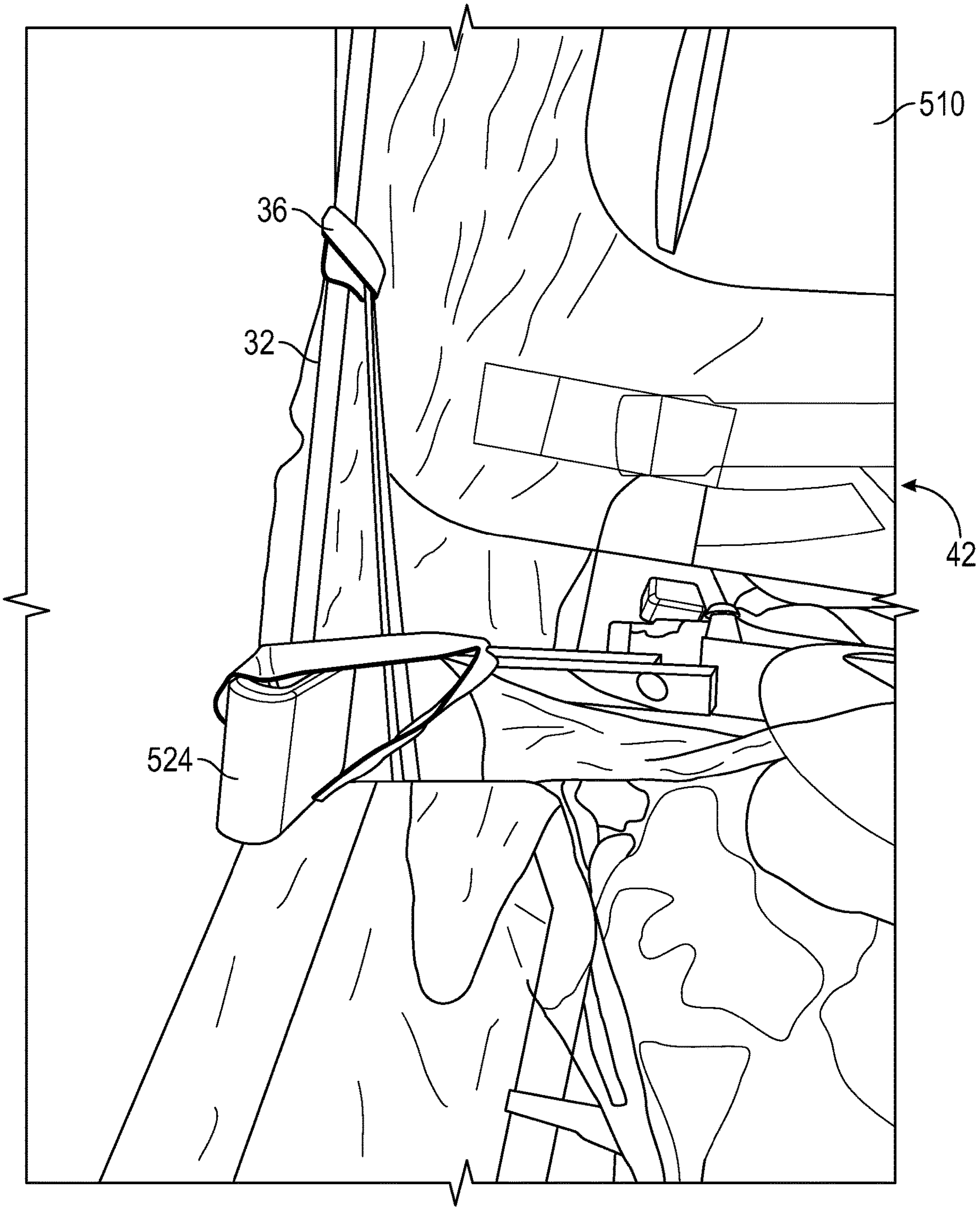
FIG. 21 is a detail view of an embodiment of the system, seen from a head end of the enclosure.

In the embodiment of FIGS. 21-22, connectors 36 are attached to each end of flexible rod 32. Two of rod 32 are present, arranged in a configuration similar to that of FIG. 1. Each rod 32 has two ends, therefore four of connector 36 are present in this embodiment. Connectors 36 are elastomeric bands configured for direct attachment to patient support apparatus 510, which is an ambulance cot in this example. The connectors of this embodiment are disposable.

Rods 32 have a free tip proximate head end 42 which is coupled to an enclosure mounting arm 524. Connectors 36 are pulled down, passed below, behind and then over, and secured around the tip of arm 524. This tie down configuration places significant additional downward pressure on the rods.

Connectors 36 proximate foot end 44 are pulled inside and passed under a side rail 527 of the PSA and then secured around the tip of rod 32 at the foot end. This configuration places additional downward and inward force on rods 32 at the foot end of the enclosure, as well as providing lateral tension toward foot end 44 which further stabilizes the enclosure during transport and active access to the patient through portals 70 (see FIG. 2).

Connectors 36 of this example are quickly releasable from the PSA, enabling the enclosure to be rapidly removed in case of an emergency. At the head end, connector 36 can be released by flicking or releasing the elastomer loop from around the tip of mounting arm 524. At the foot end, connector 36 can be released from around the tip of rod 32. By pulling upward firmly on rods 32, the enclosure can be quickly removed from PSA 510.

This configuration is seen as particularly beneficial in extreme patient transport situations such as a high wind environment, transporting a patient onto a medivac helicopter, or when a patient is physically disruptive, such as from involuntary convulsions or other flailing movements.

Example 7

Figure 23:
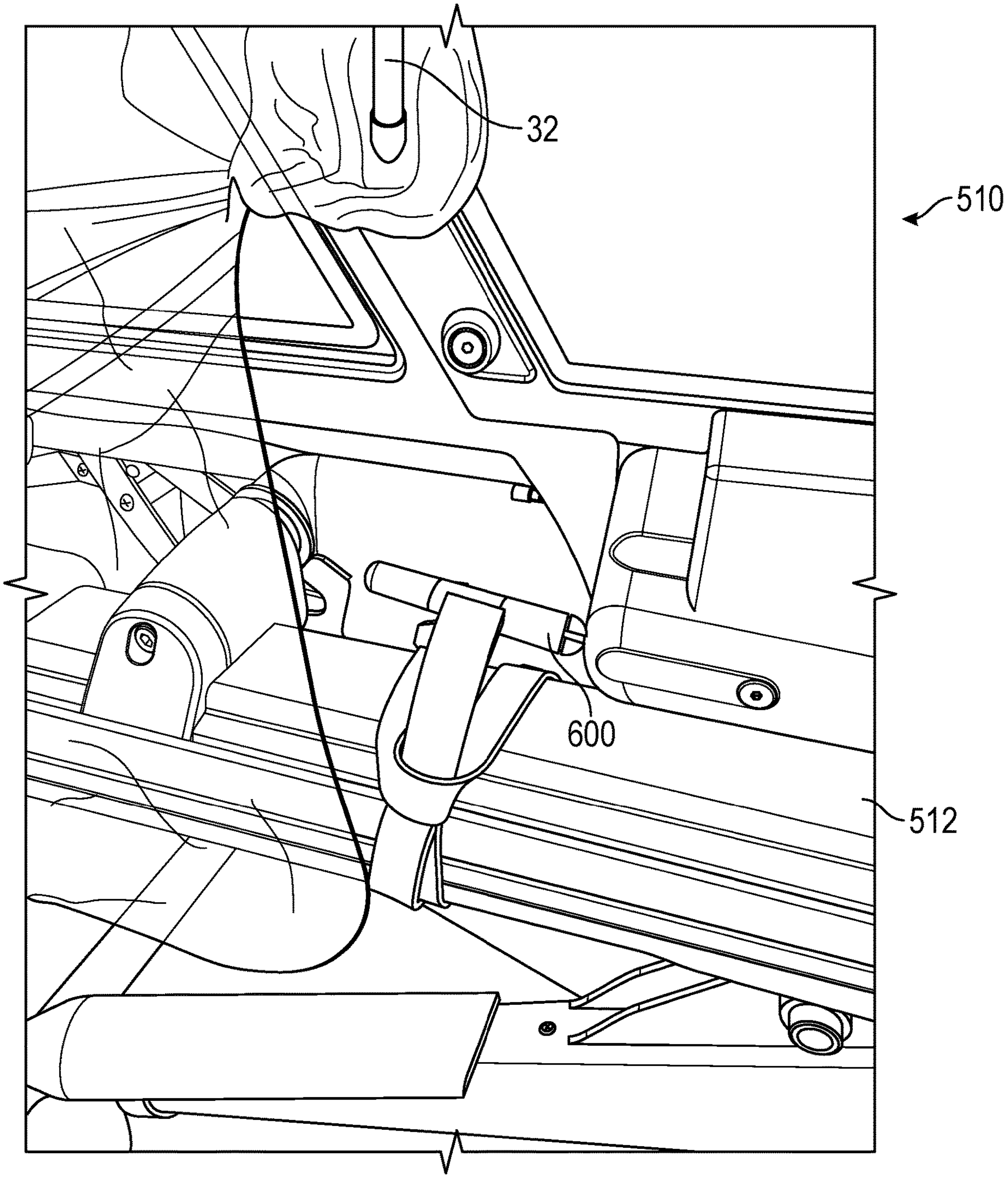
FIG. 23 is a detail view of another embodiment of the system with a patient support apparatus.
Figure 24:
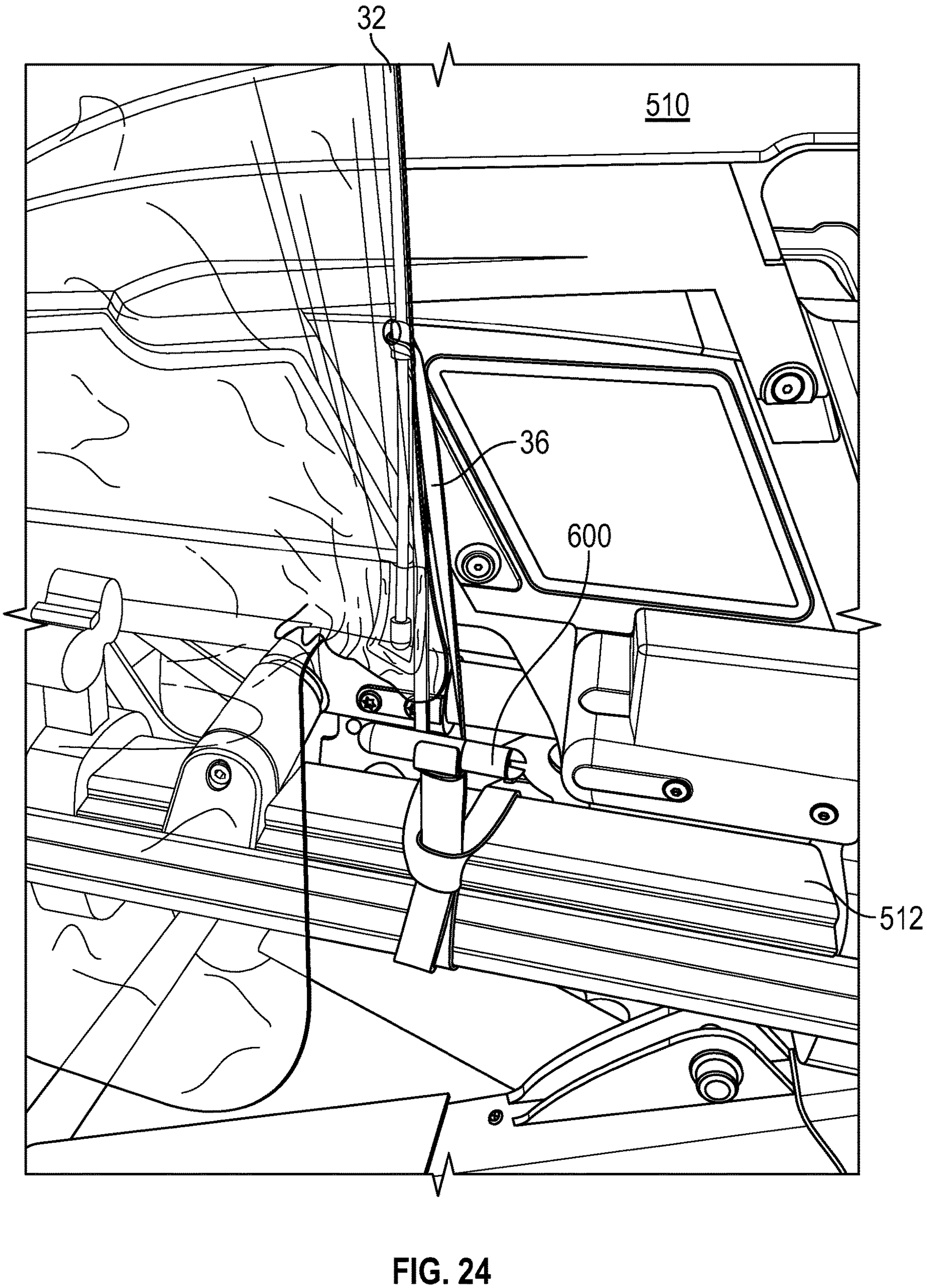
FIG. 24 is a detail view of the system in accordance with the FIG. 23 embodiment.

In the embodiment of FIGS. 23 & 24, connectors 36 are attached near each end of flexible rod 32. Two of rod 32 are present, arranged in a configuration similar to FIG. 1. Each rod 32 has two ends, therefore four of connector 36 are present in this embodiment. Connectors 36 are elastomeric bands. Four corresponding couplers 520 are connected to PSA 510, which in this case is a hospital bed having a frame 512.

Each coupler 520 includes a toggle 600 which a connector 36 may be looped around. By extending connector 36 away from rod 32 and placing it over toggle 600 attached to the bed frame, a downward force is applied through the rod, which holds the enclosure securely to the mattress surface of the PSA. This configuration is seen as particularly beneficial in securing the enclosure on a wide, flat mattress surface Toggles 600 allows for fast, simple attachment and release of the connectors 600.

The elastomeric connectors 36 are disposable elements, while the toggles 600 are meant to be durable equipment which remains attached to the bed frame to enable securing the additional enclosures with future patients.

Example 8

In this example, the enclosure is secured to an ambulance cot, while maintaining the quick release functionality in case of an emergency which would necessitate rapid removal of the enclosure.

At the head end 42, the enclosure is connected as described above with reference to FIG. 21. Connector 36 is an elastomeric band which can be pulled down, passed below, behind and then over enclosure mounting arm 524 and secured around the tip of the mounting arm. This tie down places significant additional downward pressure on the enclosure.

At the foot end of, coupler 520 having a toggle 600 is attached to the ambulance cot frame as shown in FIGS. 23 & 24. This connection provides a secure, fast mounting point for the elastomers attached to rods 32. This tie down places significant downward force on the rods at the foot end of the enclosure, as well as well as providing lateral tension toward foot end 44 which further stabilizes the enclosure during transport and patient access.

Couplers 520 may be laterally positionable along the length of frame 512. This feature may be used to increase tension on the enclosure and improve stability.

In any of the above embodiments, the connectors or couplers may be latex free, to avoid concern for latex allergies. The coupler materials may be selected to comply with hospital surface sanitization requirements, e.g., that non-disposable surfaces be capable of being sanitized by use of disinfectant wipes and then subsequently dry by evaporation within two minutes time. The use of high expandability elastomers allow for a single securing system to function across a wide variety of bed frame designs, sizes, and geometries, making for a near universal application solution.

Further provided are systems, wherein enclosure 20 may be packaged with one or more of coupler 520 according to any of the embodiments described herein.

Further provided is one or more couplers 520 according to any of the embodiments described herein.

The embodiments of the aerosol containment enclosure, systems including the aerosol containment enclosure, and methods of use described herein are exemplary and numerous modifications, combinations, variations, and rearrangements can be readily envisioned to achieve an equivalent result, all of which are intended to be embraced within the scope of the appended claims. Further, nothing in the above-provided discussions of the embodiments should be construed as limiting the invention to a particular embodiment or combination of embodiments. The scope of the invention is defined by the appended claims.

What is claimed is:

1. An aerosol containment enclosure system for cooperation with a patient support apparatus having a frame and a first surface, the first surface oriented to support a patient, the system comprising:

an enclosure including a flexible rod supporting a transparent, substantially aerosol impermeable covering;

a coupler having a strap terminating in a coupler end, the coupler configured for connection to the patient support apparatus and upwardly extensible toward the first surface;

wherein the enclosure is configurable to be semi-rigid and has a head end, a foot end, and two opposing sides; and wherein the flexible rod has a connector extensible from the flexible rod, the connector configured for engagement with the coupler end.

2. The system of claim 1, wherein:

at least one of the strap and the connector includes an elastomeric material.

3. The system of claim 1, wherein:

the strap of the coupler is configured for positioning between the frame and the first surface of the patient support apparatus.

4. The system of claim 1, the frame having a length spanning a major dimension of the frame and two opposing frame sides along the length, wherein:

the strap of the coupler terminates in two coupler ends, each of the coupler ends configured for exposure along one of the two opposing frame sides and upwardly extensible toward the first surface; and wherein the flexible rod has two tips and a connector extensible from each of the two tips, each connector configured for engagement with one of the coupler ends.

5. The system of claim 4, wherein:

the strap has a length between the two coupler ends, and the length of the strap is adjustable.

6. The system of claim 1, the frame having a length spanning a major dimension of the frame and two opposing frame sides along the length, the system further including:

the enclosure including two flexible rods, each flexible rod having two tips and a connector extensible from each of the two tips;

two couplers, the strap of each coupler terminating in two coupler ends, each of the coupler ends configured for exposure along one of the two opposing frame sides and upwardly extensible toward the first surface; and wherein each connector is configured for engagement with one of the coupler ends.

7. The system of claim 1, wherein:

the connector is configured for direct attachment to the patient support apparatus.

8. The system of claim 1, wherein:

the connector is least partially formed of a natural or synthetic elastomeric material.

9. The system of claim 1, wherein:

the strap of the coupler includes a slide configured to adjust tension on the strap.

10. An aerosol containment enclosure system for cooperation with a patient support apparatus having a frame and a first surface, the first surface oriented to support a patient, the system comprising:

an enclosure including a flexible rod supporting a transparent, substantially aerosol impermeable covering;

a coupler having a recess, the coupler configured for connection to the first surface of the patient support apparatus with the recess oriented away from the first surface;

wherein the recess of the coupler has a bore and two wings defining the bore and directly extending therefrom;

wherein the enclosure is configurable to be semi-rigid and has a head end, a foot end, and two opposing sides; and wherein the flexible rod has a free tip sized and dimensioned for insertion into the recess of the coupler, and the free tip is shaped complementary to the recess.

11. The system of claim 10, wherein:

a width of the bore is tapered to narrow from a bore top to a bore bottom.

12. The system of claim 10, the frame having a length spanning a major dimension of the frame, two opposing frame sides along the length, and a width extending laterally between the two opposing frame sides, wherein:

the coupler is adjustably positionable laterally on the first surface, in the direction of the width.

13. The system of claim 12, wherein:

the coupler is adjustably positionable longitudinally on the first surface, in the direction of the length.

14. The system of claim 10, wherein:

the coupler has a bottom face including a plurality of gripping protrusions, the plurality of gripping protrusions configured to contact the first surface.

* * * * *